(No Model.)

L. A. HAYES.
PLUME FASTENER FOR HELMETS.

No. 521,213.    Patented June 12, 1894.

WITNESSES:
Paul Johed
C. Sedgwick

INVENTOR
L. A. Hayes
BY Munn & Co
ATTORNEYS.

UNITED STATES PATENT OFFICE.

LYNN A. HAYES, OF BOLIVAR, MISSOURI; MARGARET C. HAYES ADMINISTRATRIX OF LYNN A. HAYES, DECEASED.

PLUME-FASTENER FOR HELMETS.

SPECIFICATION forming part of Letters Patent No. 521,213, dated June 12, 1894.

Application filed July 8, 1893. Serial No. 479,867. (No model.)

*To all whom it may concern:*

Be it known that I, LYNN A. HAYES, of Bolivar, in the county of Polk and State of Missouri, have invented a new and Improved Plume-Fastener for Helmets, of which the following is a full, clear, and exact description.

The object of the invention is to provide a new and improved plume fastener for helmets, which is simple and durable in construction and arranged to permit of conveniently attaching it to and detaching it from the helmet.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1:
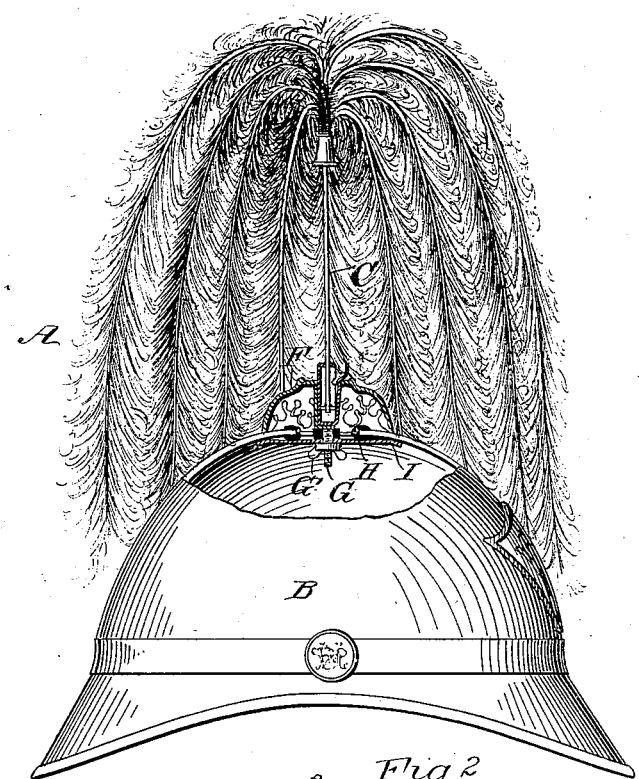
Figure 2:
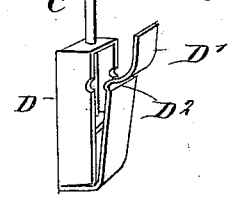
Figure 4:
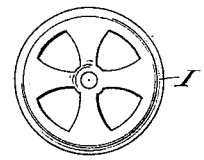
Figure 3:
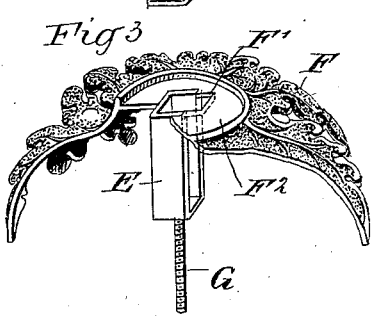

Figure 1 is a sectional side elevation of the improvement as applied. Fig. 2 is a perspective view of the plume rod head. Fig. 3 is a perspective view of the socket with parts broken out; and Fig. 4 is a plan view of a washer for holding the socket in place on the helmet.

The plume A, of the usual construction is adapted to be secured on the helmet B, and is provided with the usual plume rod C, carrying at its lower end a head D, adapted to fit into a socket E, fastened to a curved frame F, made of inverted cup-shape and resting with its edge on the top surface of the helmet, as plainly shown in Fig. 1. One side of the head D is formed with a spring catch D', having a recess D² adapted to engage a shoulder F', formed on the top plate F² of the frame F, carrying the socket E as plainly shown in Fig. 3. Thus, when the head D is inserted from above into the socket E, the spring catch D' will finally engage with its recess D² the shoulder F' of the top plate F², so as to lock the head carrying the rod and plume, in place on the helmet. By the operator pressing the upper free end of the spring catch D' the latter can be readily disengaged from the shoulder F' to permit of lifting the head out of the socket to remove the plume from the helmet.

In order to secure the socket carrying frame F in place on the outside of the helmet B, the following device is provided: From the bottom of the socket E extends downwardly a screw rod G, passing through an open washer H, secured in an aperture in the top of the helmet, the said screw rod also passing through an open washer I, bearing loosely on the inner surface of the helmet and the said washer H, as will be readily understood by reference to Fig. 1. A wing nut G', screws on the screw rod G to press against the under side of the washer I, to securely hold the several parts in place and thus fasten the frame F in position on the helmet. By unscrewing the wing nut G' the frame F carrying the socket E can be readily and quickly removed from the helmet whenever desired. It will be seen that by this arrangement, the plume can be quickly attached to or detached from the helmet at any time without the operator removing the helmet from the head, as no interior unloosening of any part is necessary, only a slight pressure on the spring catch D' being required to unlock the head to permit of removing the same and the plume from the helmet.

Having thus fully described my invention, I claim as new and desire to secure by Letters Patent—

1. A plume fastener, comprising a socket frame provided with a shoulder at its upper end and with a depending screw shank at its lower end, a washer, a nut on the said shank, and a plume rod provided with a head having a spring catch for engaging the shoulder of the socket frame, substantially as described.

2. As an improved plume fastener and in combination, an open washer adapted to be secured in the crown of a helmet, having a central aperture, a centrally apertured loose washer adapted to bear loosely on the inner surface of the helmet, a socket plate having a depending screw shank fitting through the apertures of such washers, the securing nut, and the plume rod detachably connected with such socket, all arranged substantially as shown and described.

LYNN A. HAYES.

Witnesses:
H. C. MCCRACKEN,
W. B. DUNNEGAN.